US006344260B1

(12) United States Patent
Lythgoe et al.

(10) Patent No.: US 6,344,260 B1
(45) Date of Patent: Feb. 5, 2002

(54) PATTERN PRINTING OF ADHESIVES

(75) Inventors: Alan Lennox Lythgoe, Kent (GB); Dick J van Heijningen, Alphen aan de Rijn (NL)

(73) Assignee: Trip Industries Holding B.V., Holland (NL)

(*) Notice: Subject to any disclaimer, the term of this patent is extended or adjusted under 35 U.S.C. 154(b) by 0 days.

(21) Appl. No.: 09/172,087

(22) Filed: Oct. 14, 1998

(30) Foreign Application Priority Data

Oct. 16, 1997 (GB) ............................................ 9721959

(51) Int. Cl.$^{7}$ ............................ B32B 27/14; B32B 3/00

(52) U.S. Cl. ........................ 428/195; 428/200; 428/201; 428/343; 428/354; 428/914

(58) Field of Search ................................ 428/195, 200, 428/201, 343, 354, 914

(56) References Cited

U.S. PATENT DOCUMENTS 3,607,526 A * 9/1971 Biegen ....................... 156/235
3,635,746 A * 1/1972 Karlan ........................ 117/3.1
3,847,725 A * 11/1974 Hochener ................... 161/167
4,111,734 A * 9/1978 Rosenfeld ................... 156/234
4,318,953 A * 3/1982 Smith et al. ................ 428/200
5,587,214 A * 12/1996 Mitchell, Jr. ............... 428/40.1

* cited by examiner

*Primary Examiner*—Cynthia H. Kelly
*Assistant Examiner*—B. Shewareged
(74) *Attorney, Agent, or Firm*—McDermott, Will & Emery

(57) ABSTRACT

A decalcamania or dry transfer is disclosed in which a design indicium is supported on a flexible carrier sheet and a pressure sensitive adhesive is applied to the indicium and to the surrounding surface of the carrier sheet. The adhesive is distributed over the indicium and also on the carrier sheet, at least in the vicinity of the perimeter of the indicium in a pattern of discrete dots. By applying the adhesive as a pattern of dots, the adhesive shears cleanly around the perimeter of the indicium when the indicium is transferred from the carrier sheet to a receptor surface.

19 Claims, 1 Drawing Sheet

PATTERN PRINTING OF ADHESIVES

FIELD OF THE INVENTION

This invention relates to transfers having a discontinuous or non-uniform layer of adhesive.

BACKGROUND OF THE INVENTION

The use of pressure sensitive adhesives in the production of transfers, decalcomanias, and self adhesive films requires a range of qualities in the formulation of the adhesives in which the compromises required for the ease of application and the durability of the applied product cannot both be met satisfactorily.

For transfers, decalcomanias, and self adhesive products which do not require to withstand harsh use over extended periods, the use of low tack adhesives which have just sufficient tack to adhere to the receptor surface are common.

In transfer technology, the use of low tack adhesives which are rendered less cohesive by the inclusion of tack modifying agents such as waxes, and inorganic extenders such as chalk, talc or silicas enable a multitude of indicia to be printed on the same sheet and individually transferred without accidentally transferring unselected indicia. Such adhesives can be made to adhere well to the temporary carrier sheet such that no transfer of the adhesive occurs outside the area of the indicia, the adhesive can be printed outside the area of the indicia so that accurate registration of the adhesive with complex and small indicia, for example, is not required, the adhesive shears easily around the indicia which can be transferred in close proximity to one another, say in making up the characters in a word without disturbing previously applied indicia.

However, the manipulation of the formulation of such adhesive renders the adhesive unsatisfactory for many other uses which require stronger adhesion to the receptor surface, or greater resistance to disturbance of the transfer, decalcamania, or self adhesive material once applied in industrial application, or where exterior weathering resistance is required.

Once such higher specification of the adhesive is required, it becomes unacceptable to use waxes or extenders in the same high concentrations and adhesives have to be formulated to give higher cohesion and higher tack.

When such higher performance adhesives are employed, it is difficult to control the release of one indicium from a carrier sheet and its selective transfer to a receptor surface. This is because the high tack and initial grab of the adhesive results in a large area of adhesive sticking readily to the receptor. Consequently, large parts of the transfer become attached to the receptor and individual indicium cannot be easily transferred without creasing or tearing of the designs. Other difficulties include formation of air bells due to adhesive sticking without allowing egress of air between the receptor surface and the transfer.

It is a further problem when the printed indicia are extremely thick that when the adhesive is printed normally there is a high build of adhesive around the edges of the indicia, which further complicates the problem of shear and adhesive transfer around the edges of the indicia.

SUMMARY OF THE INVENTION

In order to overcome these problems, it is the object of this invention to ensure that the ease of application previously obtained by rendering the adhesive less tacky, is obtained by physical means rather than modifying the adhesives by their formulation.

DESCRIPTION OF THE INVENTION

Figure 1:
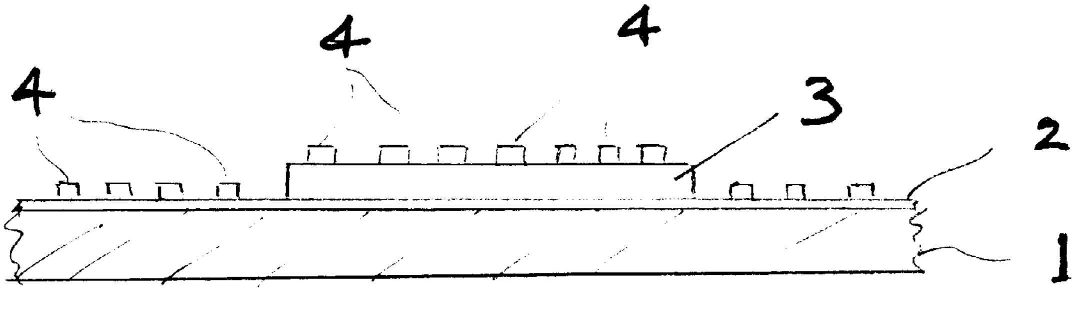
FIG. 1 depicts one embodiment of a transfer according to the present invention.

The process depends on printing adhesives rather than coating them in order to provide a selectively non-uniform surface to the adhesive. With most high tack adhesives, the flow after coating provides a smooth, glossy surface which readily grabs the receptor surface and once attached, the adhesive cannot easily be separated from it.

It is the purpose of this invention to vary the surface smoothness of the adhesive in a predictable and uniform manner, so that the balance of properties required in order to enable the processes of application, removal of trapped air, and final high attachment to the receptor surface are accomplished easily. It is also desirable in some cases that the pattern printing allows for much easier removal of the decalcomania after use. This is particularly advantageous when the substrate might be easily damaged by overall contact with a strong adhesive; such poor substrates are, for example, plaster or painted plaster surfaces.

It can be seen that the lower in tack the adhesive is, then the smoother the surface of the adhesive may be without giving rise to problems in application. As the surface of the adhesive increases in tack, then so the irregularities need to be accentuated to allow less immediate contact of the adhesive surface to the receptor surface.

It is the purpose of this invention to provide the correct degree of surface irregularity in accordance with the tack and cohesiveness of the adhesive, by printing the adhesive in patterns which take into account the required initial contact of the adhesive. The printing of the adhesives in the form of patterns also allows for variations in the thickness of the adhesive, so that when the adhesive is required to shear, then even highly cohesive adhesive can be made to shear where required by varying the thickness of the adhesive to be thinnest in the places where shear is required to take place. As the adhesive becomes more and more tacky or difficult to shear, or difficult to apply without causing air bells, then the ultimate requirement becomes to have areas where there is no adhesive coverage at all.

It has been found that an additional advantage of the pattern printing of the adhesive is that when used on glass, an overall adhesive coating gives a colored cast to the decalcornanias when viewed through the glass, whereas with the pattern print, this coloured cast is not discernible.

Preferably, the adhesive is applied in a pattern of from about 40 to 75 dots per linear inch. The dot size is preferably such that they occupy from about 10 to 50% of the area between adjacent dots. The dots should preferably not touch in the region of the perimeter of the indicia. A dot size represented by a percentage of about 10~15% gives a high degree of transparency, e.g. when transferred onto glass.

Typically, the adhesive is applied in a thickness of from about 5 to 50 microns.

The best method for printing the adhesive in patterns is by the screen process method. This can be accomplished by conventional screen process equipment for printing of sheets or by rotary screen process printing where the products are required to be produced in a reel form.

The principles which have been found to be effective to produce the right patterns in the adhesive on printing, depend also on the thickness of deposit of adhesive required, and its flow characteristics during drying or in a molten state.

In general the pattern in which the adhesives are printed can be varied by selecting the coarseness of the mesh screen. In extreme cases, where the flow of the adhesive is very low or restricted by fast drying, the adhesive will be printed in substantially the same pattern as the mesh. The adhesive is thick in the open areas of the mesh and can be almost zero in the areas of the strands of the mesh. As the adhesive increases in flow and is allowed more drying time in which the adhesive can level, then the extreme is reached in which the adhesive has a completely level surface.

When the thickness and/or flow time allow for the adhesive to form a level surface, the areas of thin or no adhesive can be emphasised by applying a stencil to the mesh. In general the thicker the adhesive and the greater its flow, the greater area of stencil must be on the mesh to retain spots or lines of little or no adhesive, whilst allowing sufficient adhesive through the open areas of the mesh.

These patterns can be uniform over the whole area of the mesh or can be restricted to particular areas. For example, the area of the mesh in the middle of a large area of an indicia may require only that the edges of the indicia are restricted by a stencil to provide areas of low coating weight of adhesive, to allow the cohesiveness of the adhesive to be reduced in value at these points in order for easier shear to be possible, so that the indicia transfers easily.

In the cases where the adhesives require to bond well, but where the receptor is smooth, such as in the case of transfers for glass, the problem is not only a question of shear but also requires to account for air entrapment. In this case, by reducing the thickness and contact of the adhesive under the indicia so that paths are left for the exit of air, solves the problem As previously mentioned, the lack of contact also prevents the colour of the glass being so evident when the decalcomanias are viewed through the glass, in the case of a double sided decalcomania, which can be viewed on either side of the glass.

It is also important in some cases that the indicia whilst being firmly held on the receptor surface, that it may be subsequently removed or repositioned. It has been found that by printing the adhesive in the form of a pattern in which the indicia is held more on the peaks formed by high deposits in some areas, that this can be easily achieved.

It is also possible by subsequent flow time or by heating, to induce the further flow of adhesive to entirely eliminate the areas of low coating weight, and a perfectly uniform adhesive layer after transfer is achieved.

For practical purposes, it may be possible to use a single pattern for a variety of sheets containing different indicia, in which case the adhesive can be printed in the form of, for example, discrete dots or, alternatively, be printed such that the dots are the non-printed areas. The patterns can be printed in a spread of dot sizes uniformly created over the sheet area to give wave forms in which the channels graduate in thickness, after allowing for some flow of adhesive after printing.

The adhesive can be printed so that in the area under the indicia, the adhesive is printed normally and in full, whilst the edge of the indicia is in dot form or the form of a vignette. This allows for shear to occur where required at the edge of the indicia, and the full adhesive power to be maintained under the indicia. If it is required to have channels of low adhesive contact under the adhesive in order to allow air to flow, and prevent the formation of bubbles under the indicia, then the dot pattern or wave pattern can be suitably provided for under the indicia area.

It is also possible to print the adhesive in patterns indirectly by first printing the adhesive on a release surface, for example, silicone paper.

This can be extremely important in the case that normal flat bed printing could not be used in the preparation of the transfer film or decalcomania, for example, where the substrate is very thin and cannot be conveniently handled. It can also be a problem if the adhesive is solvated in solvents which adversely affect the inks or strong film of the transfer. Also, if the processing of the adhesive by drying at high temperatures or by cross-linking or curing may affect the indicia, then the process can be carried out separately.

Should the transfer be processed to include the printing of a strong transfer film, and also discrete designs to be transferred within the area of the strong transfer film, using a rotary screen, rotary offset, rotary flexographic or combination of processes, it may not be practical to print the adhesive or it may be desirable to leave the adhesive printing to a later date. The reel of printed transfers can either be left in the reel or cut into sheets.

The adhesive can be coated onto silicone paper and, if in the form of a reel, the dried adhesive can be laminated onto the transfer by passing the two reels through a laminating roller. In the case of a uniform pattern, no registration would be required, but it is possible in the case of a non-regular patterned adhesive to achieve registration by printing registration marks on the transfer carrier web.

One of the benefits of this method is that there is a strong attachment of the silicone paper to the transfer web, even if the adhesive is relatively low in tack, and the silicone paper is not easily detached. This good bonding is of very considerable help if the transfers are to be subsequently cut onto small pieces for individual insertion into magazines or packages where this operation is mechanical. Premiums and promotions requiring the insertion of such transfer units can be made too difficult if the silicone paper is not securely bonded, and comes away in the insertion process.

Where the web is thin, for example, less than 50 micron, and not easily handled as a sheet in order to be adhesive printed, then the adhesive can be printed on a substantial silicone coated paper in pattern form, and after drying the adhesive, the sheets of transfer indicia can be inserted singly on top of the adhesive and the act of stacking piles of such interleaved sheets will produce normally sufficient pressure for the sheets to be laminated together, for further processing by guillotining and insertion as single units etc.

Again, where the pattern printing is uniform, no registration may be required, but it would be possible to align sheets to include the possibility of registering non-uniform adhesive patterns requiring some degree of registration of the adhesive to the indicia.

The adhesive is preferably formulated and printed as a pressure-sensitive adhesive. However, the adhesive may be substantially tack-free when printed on the transfer film or decalcomania, but rendered tacky by application of a tackifying agent prior to use.

In cases where the adhesive is printed as a pattern of dots, these may be of any shape, although circular dots are preferred. The pattern of dots may be uniform or vary as between the man part of the indicia and their perimeter.

Referring to the single FIGURE of drawings, this shows a sectional elevation of a dry transfer in accordance with the invention.

A carrier sheet (1), e.g. about 50 microns thick, is coated with a thin layer (2) of a release agent. A design indicia (3) is printed onto the release layer and is typically about 10~20 microns thick. Over the indicia and release layer, a pressure sensitive adhesive is printed as a series of dots (4).

The following Examples will illustrate the invention and the manner in which it may be carried into effect.

EXAMPLES

Example 1

Dry transfer for application to windows.

A carrier film comprising a polyester film of a thickness of 50 micron was surface coated with a release agent which allows printed indicia to release easily from the polyester, but has good adhesion to a pressure sensitive adhesive when printed outside the area covered by the indicia.

The release coating consisted of a layer of 1 micron or less dry thickness of polymethyl vinyl ether/maleic anhydride deposited from solution in isopropyl alcohol.

Graphic multicolour design indicia were printed on the release coating by screen printing using vinyl screen printing inks.

Using a clear plastisol ink, the design indicia were overprinted in register with a clear film of 10 micron thickness to hold the multicolour design together.

An adhesive was prepared consisting of an emulsified acrylic adhesive comprising an unplasticised vinyl acetate/ethylene/acrylate terpolymer.

The adhesive was screen printed in a pattern of discrete dots over the clear plastisol surface of the indicia and onto the surrounding surface of the carrier sheet.

The dots were printed to a screen pattern of 42 dots per inch with a dot size of 10%.

After drying, the adhesive is covered with a protective siliconised paper for the purpose of storing the transfer assembly prior to application.

On application to a receptor surface, the transfer releases easily even if the adhesive coating is aggressively tacky and non-shearable (when printed with solid adhesive around the edges of the indicia). The dot pattern ensures perfect shearing of the adhesive.

The lack of contact due to the dot form of the adhesive enables the transfers to be easily removed from the substrate when no longer required. The dot pattern also reduces the 'greening' of the transfer when viewed through the glass due to the colour of the glass.

Example 2

Example 1 was repeated, except that in this case the adhesive is printed with a vignette of dots around the edges of the indicia and with solid even cover within the area of the indicia. This allows a strong non-shearable adhesive to be used which then shears easily around the edges of the indicia, but gives the strongest adhesive contact for non-removable transfers. It does, however, require that the adhesive is printed in approximate register with the indicia.

Example 3

A temporary carrier sheet having a release coating was prepared as in Example 1. The release coating was coated overall with a carbon black-pigmented plastisol ink by screen printing or roller-coating and then cured.

An adhesive was prepared in the manner described in Example 1 as a dispersion in water. This dispersion was printed by screen process printing over the entire plastisol ink layer in a dot pattern consisting of dots having a size of 30%, at a distribution of 60 dots per inch and then dried.

It was found that the resulting transfer can be applied to a receptor substrate and cut or scribed using a digital plotter, such that the dot pattern allows for easy application of the transfer without air bells, and the film easily cut and unwanted sections readily removed.

This is a very good method for producing single colour one or two off products such as number plates for vehicles, when the receptor substrate is clear acrylic, for example, and the letters and numbers are backed with reflective material.

Similarly, it is very useful for producing signs of all kinds, particularly signs which will be further laminated and used for road traffic signs or general informative signs.

Example 4

Examples 1, 2 and 3 were repeated, except that the adhesive consisted of a solvent-based polyisobutyl ether type adhesive, which will absorb plasticiser from the plastisol such that the tack of the adhesive is lower in the regions outside the indicia, than where printed over the plastisol (as described in our co-pending UK Patent Application No. 9818754.5 (U.S. Ser. No. 09/141,855 filed Aug. 28, 1998).

Example 5

Examples 1, 2 and 3 were repeated, except that in this case the clear or pigmented film is a solvent-based nitrocellulose composition.

Example 6

Example 4 was repeated, except that in this case the adhesive is not printed over the ink but is printed to a silicone protective paper. The dots can be, for example, in a pattern of 42 to 75 dots per linear inch and have a size of from about 10 to 50%.

After printing and drying, the adhesive dots are then laminated to the polyester sheet carrying the indicia and can be stored for later use. When the silicone paper is stripped off, it will be found that the adhesive will have transferred to the indicia and the transfer can be used normally.

Example 7

Example 6 was repeated, except that the temporary carrier consists of printed paper face laminated with polypropylene film. Indicia or a continuous ink film were printed onto the polypropylene surface. The adhesive is dot or pattern printed onto a silicone paper as described in Example 6.

The adhesive can be applied to the face of the printed paper for display through glass, or on the reverse surface when the design is to be viewed normally.

The use of this method of pattern printing of the adhesive allows for the decalcomania to be applied to delicate surfaces such as wall paper or wall paint, and to be subsequently removed without damaging the surface.

What is claimed is:

1. A transfer material which comprises at least one indicium supported on a temporary carrier sheet and having an adhesive layer on the indicium and extending onto the carrier sheet, wherein the adhesive layer is distributed in the form of a pattern of dots and printed in a discontinuous or non-uniform pattern on the indicium and the carrier sheet, whereby the adhesive shears readily around the perimeter of the indicium thus enabling the indicium to transfer and bond to a receptor surface while shearing cleanly around the perimeter of the indicium and leaving the remaining adhesive outside said perimeter on the carrier sheet.

2. A transfer material which comprises at least one indicium supported on a temporary carrier sheet and having a high tack pressure sensitive adhesive coated on the indicium and on the carrier sheet surrounding the indicium, wherein the adhesive comprises a printed pattern of discrete dots over an area extending around the perimeter of the indicium, whereby on pressing the indicium into contact with a receptor surface and stripping away the carrier sheet, the indicium bonds to the receptor surface while the adhesive shears cleanly around the perimeter of the indicium and leaves the remaining adhesive on the carrier sheet.

3. A transfer material as claimed in claim 2 wherein the dots are substantially circular in shape.

4. The transfer material as claimed in claim 2 in which the pattern of discrete dots comprises about 40 to about 75 dots per inch.

5. The transfer material as claimed in claim 2 in which the dots are of a size such that they occupy 10 to less than 50% of the area between adjacent dots.

6. The transfer material as claimed in claim 2 in which the printed pattern of discrete dots possesses modified tack and adhesive in different parts of the carrier sheet.

7. The transfer material as claimed in claim 2 wherein the dots have a thickness between 5 and 50 microns.

8. The transfer material as claimed in claim 2 wherein the adhesive is thicker in an area covering a major part of the indicium than in an area in the region of the perimeter of the indicium.

9. The transfer material as claimed in claim 2 wherein the adhesive forms a layer over a major part of the indicium, which occupies from 50 to 100% of the area of the indicium, and forms a pattern of dots in the region of the perimeter of the indicium.

10. The transfer material as claimed in claim 2 in which the adhesive is printed in a discontinuous or non-uniform patter on the indicium and carrier sheet.

11. The transfer material as claimed in claim 2 in which the adhesive is printed by screen process printing.

12. The transfer material as claimed in claim 2 wherein the adhesive is capable of flowing when heated, whereby on heating the indicium after transfer to a receptor surface, the adhesive flows to form a continuous layer of substantially uniform thickness.

13. A transfer sheet which comprises a temporary carrier film having a release coating and a transferable film supported on the release coating, the transferable film being coated with a high tack pressure-sensitive adhesive which comprises a printed pattern of discrete dots extending over the transferable film, the transferable film being scribeable so that a desired shape can be cut from the film and bonded to a receptor surface by adhesive on the cut shape while adhesive is sheared around the perimeter of the cut shape.

14. A transfer material which comprises at least one indicium releasably supported on a carrier sheet and having a high tack pressure-sensitive adhesive on the indicium and extending onto the carrier sheet, wherein the adhesive comprises a pattern of dots in the region of the perimeter of the indicium and the adhesive on the indicium is thicker than in the region of the perimeter of the indicium.

15. The transfer material as claimed in claim 2 wherein the dots do not touch.

16. The transfer material as claimed in claim 2 wherein the dots are regularly shaped.

17. The transfer material as claimed in claim 2 wherein the dots are substantially circular in shape.

18. A transfer material which comprises at least one indicium releasably supported on the carrier sheet and having a high tack, pressure-sensitive adhesive on the indicium and extending onto the carrier sheet, wherein the adhesive comprises a pattern of dots distributed in the region of the perimeter of the indicium and wherein the dots are such a size that they occupy from about 10 to about 50% of the area between the dots.

19. The transfer material as claimed in claim 2 in which the adhesive is printed in a discontinuous or non-uniform pattern on the indicium and carrier sheet.

* * * * *